July 28, 1925.

D. E. HOLVERSON

PISTON PACKING

Filed Dec. 31, 1923

1,547,917

WITNESSES

INVENTOR
D. E. Holverson
BY
ATTORNEYS

Patented July 28, 1925.

1,547,917

UNITED STATES PATENT OFFICE.

DANIEL E. HOLVERSON, OF ABERDEEN, SOUTH DAKOTA.

PISTON PACKING.

Application filed December 31, 1923. Serial No. 683,777.

*To all whom it may concern:*

Be it known that I, DANIEL E. HOLVERSON, a citizen of the United States, and a resident of Aberdeen, in the county of Brown and State of South Dakota, have invented certain new and useful Improvements in Piston Packings, of which the following is a specification.

This invention relates to a piston packing for engines or other machines, such as pumps or the like.

The object of the invention is to provide a piston packing of this character which prevents an excess or undesirable quantity of oil finding its way into the combustion chamber of the engine or working space of the pump or the like and which in general provides for efficient and effective packing.

A further object is to provide a piston packing which is especially although not necessarily designed and adapted for use as a replacement packing with worn grooves of a piston or with a worn cylinder.

Another object is to provide a piston packing having the foregoing enumerated advantages and capacities and which is also of simple and durable construction, reliable and effective in operation, and easy and comparatively inexpensive to manufacture from materials and by means of facilities ordinarily available.

Figure 1:
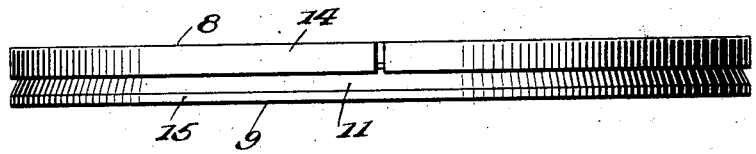
Figure 2:
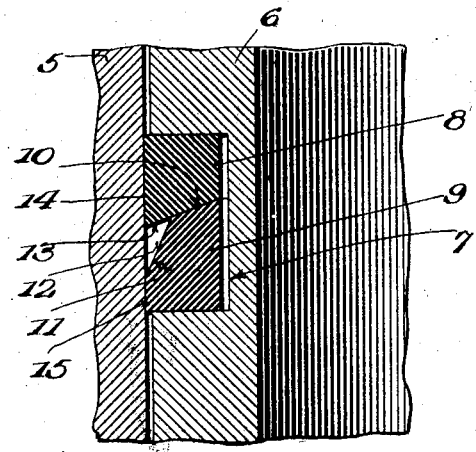

Other objects and advantages of the invention reside in certain novel features of the construction, combination and arrangement of parts which will be hereinafter more fully described and particularly pointed out in the appended claim, reference being had to the accompanying drawings forming a part of this specification, and in which:

Figure 1 is a view in elevation, showing a piston packing embodying the present invention; and Figure 2 is a fragmentary view in diametrical vertical section, showing the packing associated with a piston and cylinder.

Referring to the drawings, wherein for the sake of illustration, is shown the preferred embodiment of the invention, the numeral 5 designates the cylinder of an engine, such as an internal combustion engine or steam engine, or of a pump or other machine. A piston 6 is mounted in the cylinder and is provided in its outer periphery with one or more annular grooves 7. In each groove 7 a piston packing embodying the present invention is arranged.

The piston packing comprises a sectional ring made up of a main section 8 and an auxiliary section 9. The sections 8 and 9 consist of split rings of resilient metal, and are of equal external diameter and of equal cross sectional area.

The ring sections 8 and 9 are made to snugly fit in the groove 7 and have their meeting or contacting faces inclined, as at 10, at an acute angle of 20° or less with respect to a plane perpendicular to the longitudinal axes of the cylinder 5 and piston 6. Adjacent the meeting faces of the sections 8 and 9, the section 9 has its outer peripheral surface cut away or beveled, as at 11. A considerable portion and preferably more than half of the peripheral surface of the ring 9 is so cut away and there is in this manner defined an oil receiving pocket 12 and a downwardly inclined scraping surface 13 which terminates at the periphery of the ring in a scraping edge. In this manner there is provided on the ring 8 an outer peripheral packing surface 14 of relatively large area and on the ring 9 an outer peripheral surface 15 of relatively small area and the area of the inclined meeting surfaces 10 is reduced.

In the embodiment shown in Figure 2 the sections 8 and 9 are urged toward and into packing engagement with the cylinder by their inherent resiliency but obviously a flat band expanding spring or other suitable spring means may be employed between the bottom of the groove 7 and the inner peripheral surfaces of the sections 8 and 9 for this same purpose.

In Figure 2, the packing is illustrated in conjunction with a vertically disposed cylinder and piston and the meeting faces of the sections 8 and 9 are inclined downwardly at an acute angle. Obviously in a horizontal engine or pump the inclination of the meeting faces would be outwardly and would be an equivalent of the structure illustrated. By cutting away or bevelling the lower ring section 9 so as to lessen the area of the meeting surfaces the frictional resistance to the alternate expansion and compression of the ring sections in following a worn or tapered cylinder wall is greatly reduced and this action is enhanced. The formation of the ring sections of equal cross sectional area and the inclination of the meeting faces of the ring sections gives the proper wedge action to resiliently hold the packing surfaces 14 and 15 of the ring sections 8 and 9 in packing engagement with the cylinder wall and the end surfaces of these ring sections in packing engagement with the walls of the groove 7 and also increases the wearing qualities of the packing by preventing excessive cylinder wall pressure. If any oil finds its way in between the packing surface 15 and the cylinder wall it encounters the scraping surface 13 and is collected in the oil pocket 12 from whence it is properly distributed on the cylinder wall. The downward inclination of the surface 13 facilitates accumulation of the oil in the pocket 12.

I claim:

A packing for use in packing a piston which has a groove in a cylinder and comprising a ring adapted to be fitted in said groove and made up of a pair of transversely rigid and circumferentially resilient sections directly engaged with each other, the sections of the ring having their engaging faces inclined with respect to a plane perpendicular to the longitudinal axis of the piston and cylinder, one of the sections of the ring being cut away on an incline around its outer periphery and adjacent the engaging faces of the sections to provide an oil receiving pocket and an oil distributing surface, the other section presenting an undercut scraping edge around the pocket and adapted to scrape the oil from the cylinder and deflect it into the pocket.

DANIEL E. HOLVERSON.